United States Patent [19]

Shidlovsky

[11] 4,014,813
[45] Mar. 29, 1977

[54] HAFNIUM PYROPHOSPHATE PHOSPHORS AND METHODS OF PREPARATION

[75] Inventor: Igal Shidlovsky, Princeton, N.J.
[73] Assignee: RCA Corporation, New York, N.Y.
[22] Filed: Jan. 13, 1975
[21] Appl. No.: 539,906

Related U.S. Application Data

[63] Continuation-in-part of Ser. No. 439,541, Feb. 4, 1974, abandoned.

[52] U.S. Cl. .......................... 252/301.4 P; 423/305
[51] Int. Cl.² .................. C09K 11/08; C01B 25/26
[58] Field of Search .................. 423/299, 304, 305; 252/301.4 P

[56] References Cited

UNITED STATES PATENTS 3,351,436  11/1967  Sarver ............................. 423/311
3,642,651  2/1972   Marboe et al. ............. 252/301.4 P
3,814,967  6/1974   Takata et al. .............. 252/301.4 P

FOREIGN PATENTS OR APPLICATIONS 680,846  10/1952  United Kingdom ......... 252/301.4 P

OTHER PUBLICATIONS

Chemical Abstract, 3150a, (1954).

*Primary Examiner*—Oscar R. Vertiz
*Assistant Examiner*—Gregory A. Heller
*Attorney, Agent, or Firm*—G. H. Bruestle; L. Greenspan

[57] ABSTRACT

Self-activated ultraviolet-emitting hafnium pyrophosphate phosphors. Up to about 20 mole percent of the hafnium may be substituted with one or more of zirconium, germanium and silicon. The phosphors, which may be excited by ultraviolet radiation, x-rays and electron beams, may be used as energy converters in photodevices. The phosphors may be prepared by heating a mixture of a hafnium compound, a phosphate (no added activator ions) and optionally compounds of one or more of zirconium, germanium and silicon, which are present in proportions up to about 25 mole percent of the hafnium present, at about 1000° to 1300° C in air.

14 Claims, 2 Drawing Figures

HAFNIUM PYROPHOSPHATE PHOSPHORS AND METHODS OF PREPARATION

CROSS REFERENCE TO RELATED APPLICATION

This is a continuation-in-part of application Ser. No. 439,541, filed Feb. 4, 1974, having the same applicant, title and assignee hereof and now abandoned.

BACKGROUND AND SUMMARY OF THE INVENTION

This invention relates to novel ultraviolet-emitting phosphors and to methods of preparation thereof.

Very little is known about inorganic cathodoluminescent materials which can emit at wavelengths below 3000 A, and very few such phosphors are known. One such phosphor, disclosed in U.S. Pat. No. 2,770,749 to A, Bril et al., is a self-activated zirconium pyrophosphate phosphor ($ZrP_2O_7$). This phosphor contains highly-charged zirconium ions with an $np^6nd^0$ configuration. The emission is believed to come from the metal ions themselves, through charge transfer transitions between the $O^{2-}$ anions and the central metal ion. No activators are needed for this process.

The novel phosphors herein consist essentially of hafnium pyrophosphate wherein 0 to 20 mole percent of the hafnium is substituted with at least one of zirconium, germanium and silicon. The unsubstituted species may be represented by the molecular formula $HfP_2O_7$. The phosphors are prepared by heating in air at temperatures of about 1000° to 1300° C mixtures of a hafnium compound and a phosphate for a period of at least 30 minutes. No additional ions are required to activate the phosphor.

The novel phosphors are roentgenoluminescent, cathodoluminescent and photoluminescent, emitting in broad spectral bands which peak at about 2600 to 3000 A. The novel phosphors may be used for their ultraviolet emission; for example, in cathode-ray display tubes, flying spot scanners, or in any of the applications mentioned in the above-cited patent to Bril et al.

DETAILED DESCRIPTION OF THE PREFERRED EMBODIMENTS

Figure 1:
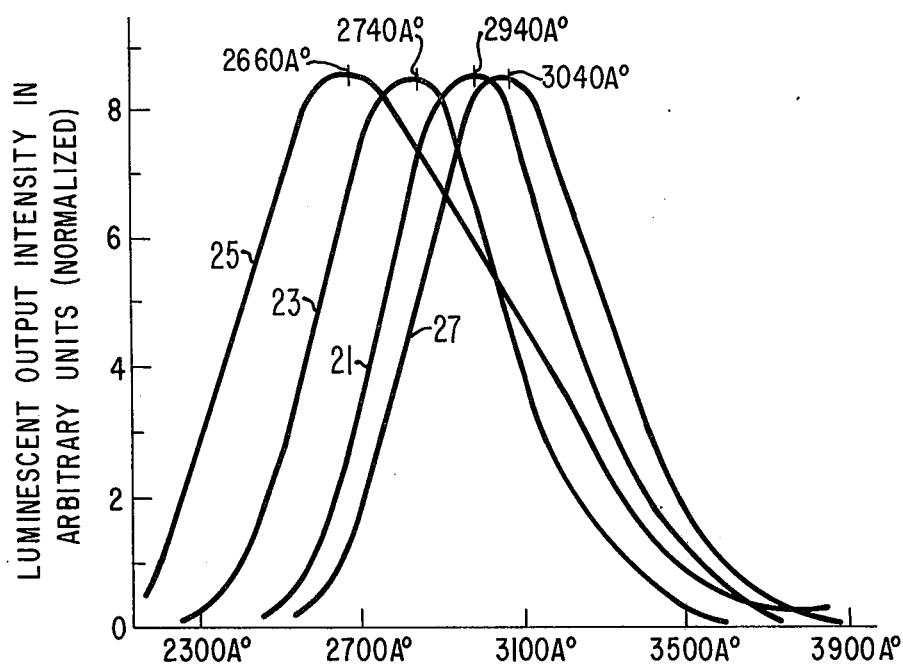
FIG. 1 is a family of curves comparing the cathodoluminescent emissions of novel hafnium pyrophosphate phosphors made from a mixture having a stoichiometric ratio of hafnium and phosphate (curve 21), a mixture having an excess of phosphate (curve 23), and a mixture having an excess of hafnium (curve 25), and the emission from a zirconium pyrophosphate phosphor prepared from a stoichiometric mixture (curve 27).

Example 1 — To prepare hafnium pyrophosphate phosphor from a stoichiometric mixture, mix 1.00 gram-molecular weight hydrated hafnium oxychloride $HFOCl_2 \cdot 8H_2O$ with 2.00 gram-molecular weight ammonium dihydrogen phosphate $NH_4H_2PO_4$. Place the mixture in an alumina container and heat the mixture in air at about 800° C for about 4 hours (preliminary firing), and cool to room temperature. Crush the material and reheat the mixture in an alumina container in air for about 4 hours at about 1200° C (main firing) and then cool to room temperature. The reheating cycle may be repeated to improve the uniformity in the product. By analysis, the product is shown to be $HfP_2O_7$ having a cubic crystal structure with $a = 8.216$ A. A small amount of $HfO_2$ appears in the x-ray pattern. The product is roentgenoluminescent, photoluminescent and cathodoluminescent, emitting in the 2400 to 3400 A spectral range with a peak at about 2940 A. With cathode-ray excitation, the phosphor exhibits a power efficiency of about 8 percent. A cathodoluminescent emission curve 21 for the hafnium pyrophosphate phosphor prepared by this example is shown in FIG. 1. A similar curve 27 for a zirconium pyrophosphate phosphor made by a similar method, also shown in FIG. 1, is shifted about 100 A toward longer wavelengths.

Example 2 — Follow the procedure of Example 1 except substitute hafnium oxide $HfO_2$ for hydrated hafnium oxychloride. A similar product to that produced in Example 1 is produced.

Example 3 — To prepare hafnium pyrophosphate phosphor from a mixture containing excess phosphate, follow the procedure of Example 1 except substitute 2.20 gram-molecular weight ammonium dihydrogen phosphate (instead of 2.00 gram-molecular weight). By analysis, the product is shown to be $HfP_2O_7$ having a cubic crystal structure with $a = 8.2105$ A. A very small amount of $HfO_2$ is present in the x-ray pattern. The product is roentgeneoluminescent, photoluminescent and cathodoluminescent, emitting in the 2000 to 3000 A spectral range with a peak at about 2740 A. With cathode-ray excitation, the phosphor exhibits a power efficiency of about 2 percent. A cathodoluminescent emission curve 23 for the $HfP_2O_7$ phosphor prepared by this example is shown in FIG. 1.

Example 4 — To prepare a hafnium pyrophosphate phosphor from a mixture containing excess hafnium, follow the procedure of Example 1 except substitute 1.8 gram-molecular weight ammonium dihydrogen phosphate (instead of 2.0 gram-molecular weight). The product is cubic with $a = 8.213$ A. A small amount of $HfO_2$ is present in the x-ray pattern. The material is cathodoluminescent, as shown by the curve 25 of FIG. 1, with a peak at about 2660 A and power efficiency of about 1.5 percent.

Example 5 — To prepare a stoichiometric $HfP_2O_7$ by another method, place 10 grams of $HFOCl_2 \cdot 8H_2O$ powder in a Teflon beaker and add concentrated phosphoric acid thereto. The amount of acid is just enough to wet all of the powder. That amount is in excess to the stoichiometric amount which is needed to convert all the oxychloride to pyrophosphate. Heat the mixture on a hot plate with stirring for about six hours in order to produce a thick slurry. Transfer the slurry to a silica container. Heat the container and slurry in a furnace in air for about 4 hours at 400° C, then for about 6 hours at 800° C and then for about 4 hours at 1000° C. After the 1000° C treatment, the resultant material is cooled, crushed and ground. The ground material is reheated in a silica container at about 1200° C for about 6 hours in air. The reaction product is a powder consisting essentially of cubic hafnium pyrophosphate. Cathodoluminescence measurements of the material prepared by this example showed that the material emits in a broad band which peaks at about 2920 A with a power efficiency of 9.6%.

Example 6 — Follow the procedure in Example 5 except substitute a mixture of $P_2O_5$ and water for the phosphoric acid. The resulting product is similar to the one described in Example 5.

GENERAL CONSIDERATIONS

The novel phosphor may be prepared by a variety of procedures. By a first method of synthesis, a hafnium compound is reacted with a phosphate compound. Any hafnium compound, such as hafnium oxide or hafnium oxychloride, may be used. Any phosphate, such as ammonium phosphate, ammonium dihydrogen phosphate, sodium pyrophosphate, or potassium dihydrogen phosphate may be used. Water-soluble phosphates of light cations are preferred. Besides hafnium and phosphate ions, no other ions are neccessary. Cations which degrade the luminescence in the product, particularly cations of the heavy metals, should be avoided. The materials should be thoroughly mixed, and then given a preliminary firing to reduce the volatilization of phosphate during the main firing. Then, the mixture is reheated in air at temperatures between 1000° and 1300° C, preferably 1150° to 1250° C, for any convenient length of time greater than about 30 minutes, and then cooled to room temperature. The reheating (main firing) cycle may be repeated as many times as is desired in order to improve the uniformity of the product. The emission peak of the product may be shifted, as disclosed in the examples, by including controlled proportions of hafnium and/or phosphate in the reheating (main firing) cycle. The starting mixture may be mixed as dry powders, but is preferably mixed with an excess of water, which is later evaporated. The wet mixing helps to obtain a more homogeneous mixture. After the water is evaporated from the slurry, the remaining solid is ready for heat treatment. Following heat treatment, the reaction product may be washed to remove any water-soluble material that is present.

By a second method of synthesis, a hafnium compound is reacted with phosphoric acid or $P_2O_5$ and water. The second method yields pure hafnium pyrophosphate that is substantially free of residual oxide. Residual oxide is always present as a second phase together with the pyrophosphates when the novel phosphors are prepared by the foregoing first method. In one embodiment of the second method, the synthesis is done by reacting hafnium oxychloride and phosphoric acid (or a solution of $P_2O_5$ and water). A mixture of hafnium oxychloride and phosphoric acid is first heated while stirring in a Teflon container on a hot plate. Then the mixture is transferred to a silica container. The container and contents are heated gradually to 1000° C. First, the temperature of the container is raised to 400° C, then to 800° C, and then to 1000° C, soaking the contents for a few hours at each of the mentioned temperatures. After the heat treatment at 1000° C, the material is cooled to room temperature, crushed and ground. Then, the ground material is heated in air at 1200° C.

FIG. 1 shows the cathodoluminescent emission spectra of $HfP_2O_7$ and $ZrP_2O_7$ phosphors made from stoichiometric mixtures in curves 21 and 27 respectively, as was obtained from samples prepared by the procedure of Example 1. The intensity scale in the Figure is arbitrary and does not represent the comparable emission intensity between the phosphors. The $HfP_2O_7$ phosphor peaks at about 2940 A and the $ZrP_2O_7$ phosphor peaks about 100 A higher. Power efficiency measurements show that the $HfP_2O_7$ phosphor exhibits, under cathode-ray excitation, about twice the efficiency of a similar $ZrP_2O_7$ phosphor. Our best results to date are about 4 percent efficiency for a $ZrP_2O_7$ phosphor and about 8 percent efficiency for a $HfP_2O_7$ phosphor. Because of differences in measuring techniques and equipments, there may be differences between the results published in the literature for $ZrP_2O_7$ phosphor and the results of our measurements. However, the relative values between the phosphors are significant. $HfP_2O_7$ phosphors were found to be more efficient and to peak at shorter wavelengths than the corresponding $ZrP_2O_7$ phosphor.

The cathodoluminescent emissions from $HfP_2O_7$ phosphors that were prepared by us have varied somewhat. All of the samples made emit in broad bands that peak in the range from about 2950 A to about 2660 A. The emission spectra for the two extreme emissions of $HfP_2O_7$ phosphors are plotted on FIG. 1 with the curves 21 and 25. The plot is of the luminescence intensity in arbitrary units against the wavelength in angstroms. The relative intensity between the two emission curves is not maintained in FIG. 1. The power efficiency for the 2940 a peak emission is about 8 percent and about 1.5 percent for the 2660 A peak emission.

The photoluminescence at room temperature has been studied. Excitation with 1900 A radiation causes emission in the ultraviolet region, at about the same wavelengths as the cathodoluminescence. This absorption is assumed to be part of the band edge which tails to lower energies due to internal defects. Precise measurements of the fundamental and actual band edge in the material are not available. Two more absorption bands are observed at 2200 A and 2300 A. The 2200 A absorption is connected with the ultraviolet emission and the 2300 A with visible emission. The visible emission is very weak in comparison to the ultraviolet emission.

As was mentioned before, the wavelengths of the emission band may be somewhat variable. Emission bands that peak at longer wavelengths are somewhat more efficient than emission bands at shorter wavelengths. The efficiency and the emitted energy are correlated together with the amount and nature of internal defects in the material. Generally, when more defects are present in the material, the power efficiency of the luminescence is higher, but the emitted radiation is at longer wavelength (lower energy).

In Dutch patent No. 73114 to F. A. Kroger et al. (1954 Chemical Abstracts 3150($a$)) there is disclosed, among other phosphors, a titanium-activated hafnium pyrophosphate which emits green luminescence when excited with ultraviolet rays or electrons. The novel phosphor, as pointed out above, differs in that there is no activator present and also in that the phoshor emits almost entirely in the ultraviolet spectral region when excited.

Figure 2:
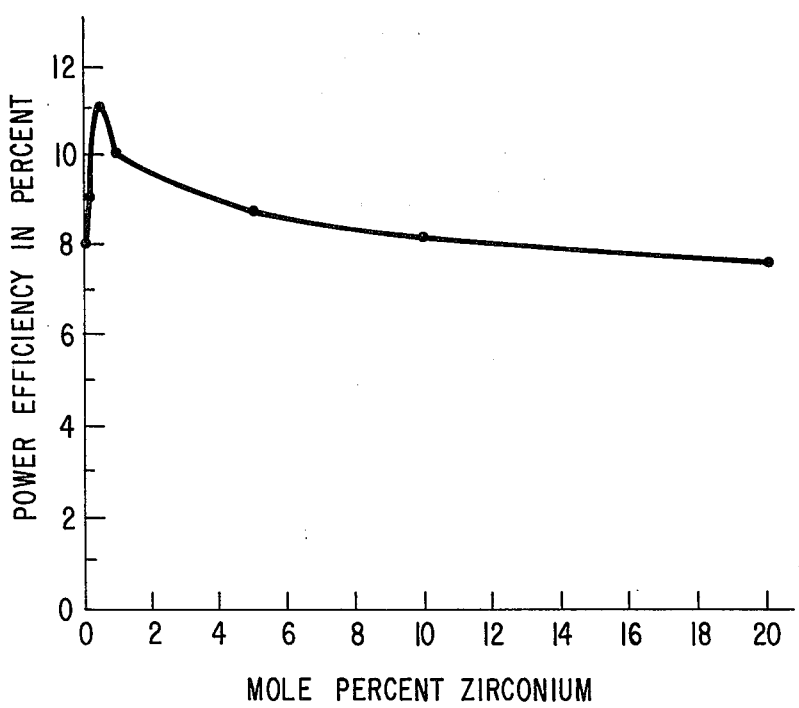
FIG. 2 is a curve showing the effect on power efficiency of substituting zirconium for up to 20 mole percent of the hafnium in $HfP_2O_7$.

Impurities which are introduced into the starting mixture have a large influence on the cathodoluminescent power efficiency of the product. Substituting one or more of silicon, germanium and zirconium for a portion of the hafnium in hafnium pyrophosphate increases significantly the efficiency of cathodoluminescence of the product. Measurements have been done with materials which contain up to 20 mole percent zirconium in the hafnium pyrophosphate as shown by the curve in FIG. 2. The most efficient phosphor found in this series is one containing around 0.5 mole percent of zirconium. Zirconium-substituted hafnium pyrophosphate may be prepared in a similar way to the preparation described above except that a zirconium compound substitutes for a portion of the hafnium compound. For example, mix 0.5 mole percent zirconium oxychloride with 99.5 mole percent hafnium oxychloride and add phosphoric acid. Then, proceed as in Example 5. A hafnium pyrophosphate with 0.5 percent zirconium prepared by this method was measured to emit with 11 percent power efficiency under cathode-ray excitation. The emission is in a broad band which peaks at around 2910 A.

Similar studies have been done on silicon-substituted hafnium pyrophosphates and germanium-substituted hafnium pyrophosphates. Silicon- or germanium-substituted hafnium pyrophosphate may be prepared by the method of Example 5 except that silicon dioxide $SiO_2$ or germanium dioxide $GeO_2$ is substituted for a portion of the hafnium compound. In one embodiment, the $SiO_2$ or $GeO_2$ is first added to hot concentrated phosphoric acid, and after the oxide reacts with the acid, the hafnium oxychloride is added. The rest of the preparation is the same as described in Example 5 with silicon- or germanium-substituted hafnium pyrophosphates.

The best efficiency is achieved with around 1 mole percent of substituent. Power efficiencies were measured to be over 10 percent, and emission peaks were measured at around 2910 A. The power efficiencies were more than 10 percent higher than unsubstituted zirconium pyrophosphates. Materials prepared by Example 5, although not intentionally doped, have substantial amounts of silicon and germanium. Silicon is introduced mainly from the container. The phosphoric acid contains also silicon and germanium. The best power efficiency achieved from an unsubstituted sample, which was prepared from the oxides, or oxychloride and ammonium dihydrogen phosphate as by the procedure of Example 1, was measured as 8 percent.

I claim:

1. A luminescent material consisting essentially of hafnium pyrophosphate, wherein 0 to 20 mole percent of said hafnium is replaced with at least one member of the group consisting of zirconium, germanium and silicon, said luminescent material exhibiting a peak luminescence in the range of 2600 to 3000 A.

2. The luminescent material defined in claim 1 consisting essentially of hafnium pyrophosphate.

3. The luminescent material defined in claim 2 having a peak luminescence shorter than 2940 A prepared by a process including the step of heating in air between about 1000° and 1300° C a mixture containing one mole part hafnium as a hafnium compound and more than two mole parts phosphate as a phosphate compound.

4. The luminescent material defined in claim 2 having a peak luminescence shorter than 2940 A prepared by a process including the step of heating in air between about 1000° and 1300° C a mixture containing one mole part hafnium as a hafnium compound and less than two mole parts phosphate as a phosphate compound.

5. The luminescent material defined in claim 1 wherein at least a portion of said hafnium is replaced by at least one member of the group consisting of zirconium, germanium and silicon.

6. The luminescent material defined in claim 5 wherein said portion of hafnium is replaced by zirconium.

7. The luminescent material defined in claim 5 wherein said portion of hafnium is replaced by germanium.

8. The luminescent material defined in claim 5 wherein said portion of hafnium is replaced by silicon.

9. A method for preparing a luminescent material comprising mixing together a hafnium compound and a phosphate compound, heating said mixture in air at temperatures between 400° and 1000° C whereby said mixture reacts, cooling said reacted mixture to room temperature, and then heating said reacted mixture at temperatures between 1000° and 1300° C in air for at least 30 minutes thereby forming a luminescent hafnium pyrophosphate having a peak luminescence in the range of 2600 to 3000 A.

10. The method defined in claim 9 including mixing with said hafnium compound and said phosphate compound at least one member of the group consisting of zirconium compounds, germanium compounds and silicon compounds, the hafnium in said mixture comprising at least 80 mole percent of the total amount of hafnium, zirconium, germanium and silicon present in said mixture.

11. The method defined in claim 9 including mixing together a hafnium salt and an ammonium phosphate, and then heating said mixture in air at about 1150° to 1250° C for about 40 to 80 minutes.

12. The method defined in claim 9 wherein said mixture contains 1 mole part hafnium, as a compound thereof, and about 2 mole parts phosphorus, as a phosphate compound.

13. The method defined in claim 9 wherein said mixture contains 1 mole part hafnium and more than 2 mole parts phosphorus as a phosphate compound.

14. The method defined in claim 9 wherein said mixture contains one mole part hafnium and less than two mole parts phophorus as a phosphate compound.

* * * * *